(No Model.)
J. L. YOST & J. B. McCUNE.
BICYCLE.
No. 367,883. Patented Aug. 9, 1887.
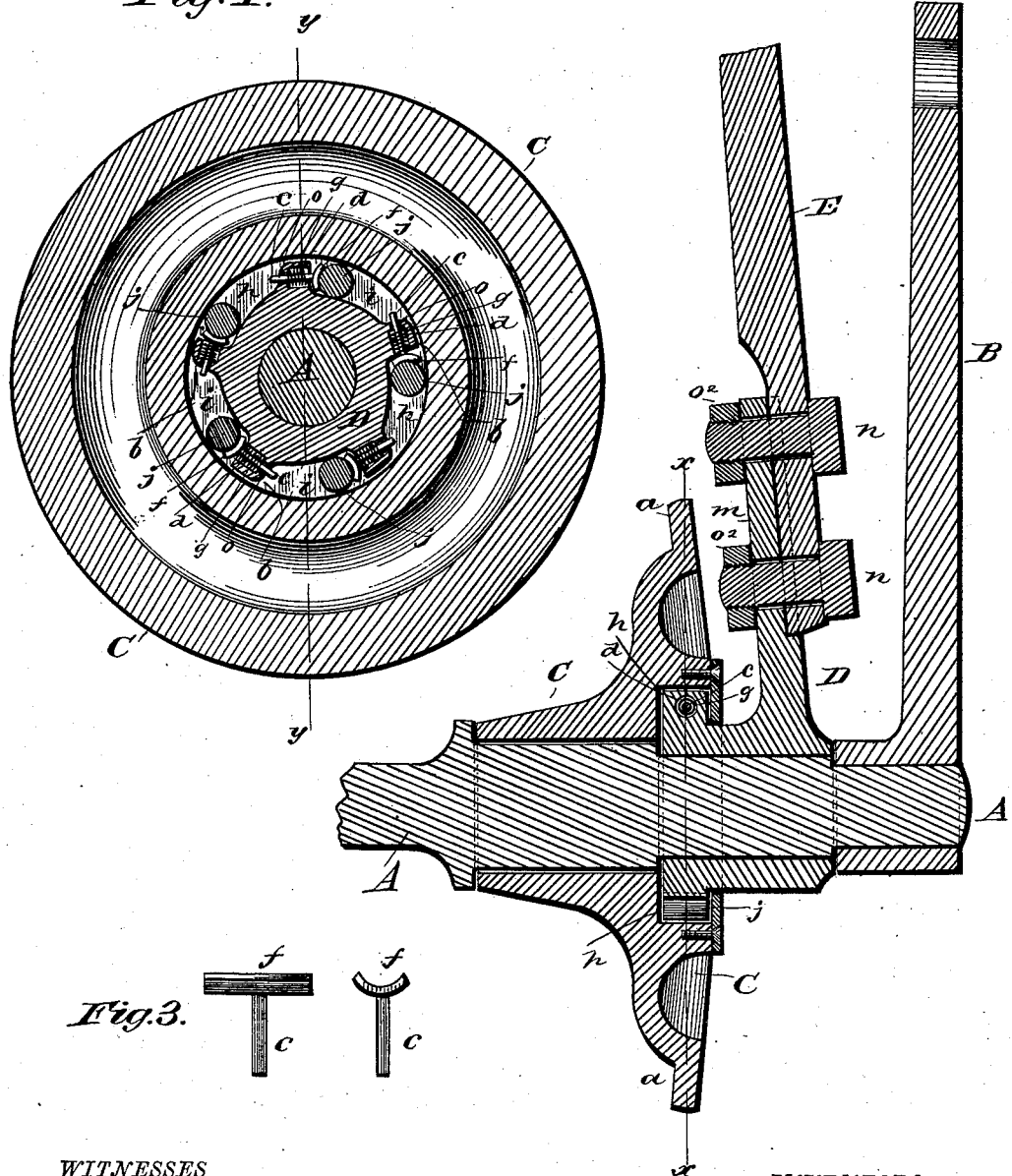
WITNESSES
INVENTORS

UNITED STATES PATENT OFFICE.

JOSEPH L. YOST AND JOSEPH B. McCUNE, OF WORCESTER, MASSACHUSETTS, ASSIGNOR TO THE SPRINGFIELD BICYCLE MANUFACTURING COMPANY, OF MASSACHUSETTS.

BICYCLE.

SPECIFICATION forming part of Letters Patent No. 367,883, dated August 9, 1887.

Application filed April 18, 1887. Serial No. 235,260. (No model.)

*To all whom it may concern:*

Be it known that we, JOSEPH L. YOST and JOSEPH B. McCUNE, citizens of the United States, residing at Worcester, county of Worcester, Massachusetts, have invented new and useful Improvements in Bicycles, of which the following is a specification.

This invention relates to certain new and useful improvements in bicycles; and it consists, substantially, in such features of construction, arrangement, and combinations of parts, as will hereinafter be more particularly described, and pointed out in the claims.

The object of the invention is to provide means whereby the steering-fork of a bicycle is checked or prevented from being thrown too far forward when obstructions to the travel of the driving-wheel are encountered, thereby overcoming the liability of the rider of the machine taking what is ordinarily termed a "header," in that his position on the machine is always maintained centrally by reason of the resistance offered to any retrograde tendency of the drive-wheel.

Further, the invention has for its object to provide a simplified form of attachment of the steering-fork of the machine to the axle-bearing, by which all tendency to twisting and bending of the same at this point is overcome, all as will more fully appear from the description hereinafter following, when taken in connection with the accompanying drawings, wherein—

Figure 1 is a vertical sectional view taken on the line $x\ x$ of Fig. 2, by which the construction and arrangement of the parts constituting the fork-check mechanism will be more fully understood. Fig. 2 is a vertical sectional view of Fig. 1 on the line $y\ y$, and showing also as much of a bicycle in section as is necessary to illustrate the manner of attachment of the steering-fork; and Fig. 3 shows the cup-shaped plates for holding the balls in position.

Before proceeding with a more full description of our invention we desire to state that our improvements are more especially adapted to the class of bicycles known as "crank-machines," and we also wish to state that we are aware of former inventions having like objects in view as the present; but it is thought the particular construction and arrangement of parts herein resorted to substantially differs from anything ever heretofore devised.

Reference being had to the several parts by the letters marked thereon, A represents the axle of an ordinary bicycle, B the operating-crank, and C the wheel-hub fitting around the axle in the usual manner and having the radial sockets $a$, designed to receive one end of the spokes of the wheel.

D represents the bearing for the axle, and which also contributes toward constituting the check devices for the steering-fork E. The inner end of this bearing is formed or provided with a series of radial wings or tangents, $b$, the portions intermediate thereof or intersecting the same being gradually inclined, and each of the said radial wings is perforated, as at $o$, and formed with a cavity or recess, $d$, the perforations being for the reception of pins $c$, formed with concaved or cup-shaped plates $f$, and the cavities or recesses being designed to hold the spiral springs $g$, the tendency of which is to force the said plates outward. This end of the bearing D is received into an annular chamber or recess, $h$, formed in the opposing side of the wheel-hub C, and it will be seen that spaces $i$ will be formed between the wall of said chamber and the several wings $b$. Into such spaces balls or rolls $j$ are placed, the same being preferably of hard steel, and of such diameter as that they will snugly or tightly fit within the spaces $i$ at their widest extremities, the said rolls resting within or against the plates $f$, and it will thus be seen that the tension or pressure of the springs will constantly keep them tightly wedged, so that their action will be most prompt in resisting the forward throw of the fork when the drive-wheel encounters an obstruction.

It is known that as quickly as an obstruction is met with in the travel of a bicycle the tendency of the steering-fork is to throw suddenly forward, due to the retrograde of the wheel, and the rider is most frequently thrown from the machine; but with the construction of devices thus far explained it will be seen that as soon as the drive-wheel encounters an obstacle in its path all tendency of the fork to go forward is distributed to and received by the check devices described, and the wheel thus caused to ride over objects of any ordinary size, the seat of the rider being meanwhile centrally maintained and no danger of falling had.

The connection or attachment of the ends of the fork to the bearing is by forming the projection $m$ of the latter with a sunken or recessed portion in its side, into which the end of the fork is fitted, the two being then firmly secured by pins or bolts $n$ passing through and secured by nuts $o^2$. This form of fastening obviates all tendency to distortion of either the bearing or the fork, and, as distinguished from the ordinary hinge-connection resorted to in former instances, we have found the same to possess great advantages in permitting a rapid and secure fitting of the several parts to their places.

Having thus described our invention, what we claim as new, and desire to secure by Letters Patent, is—

1. In a bicycle, the combination, with the wheel-hub having annular recess, of the axle-bearing D, formed with radial wings intersected by inclines, and perforated and recessed, as shown, the rolls, and the spring-actuated plates, the parts being constructed and arranged in the manner and for the purpose described.

2. In a bicycle, the combination, with the wheel-hub having annular recess, of the bearing D, having the wings and fitting such recess, and formed with projection $m$, the rolls, and spring-actuated plates, and the fork E, secured to the part $m$, substantially as shown and described.

In testimony whereof we have hereunto set our hands in the presence of two subscribing witnesses.

JOSEPH L. YOST.
JOSEPH B. McCUNE.

Witnesses:
WILLIAM MAYNARD,
FRANK W. AYMAR.